UNITED STATES PATENT OFFICE.

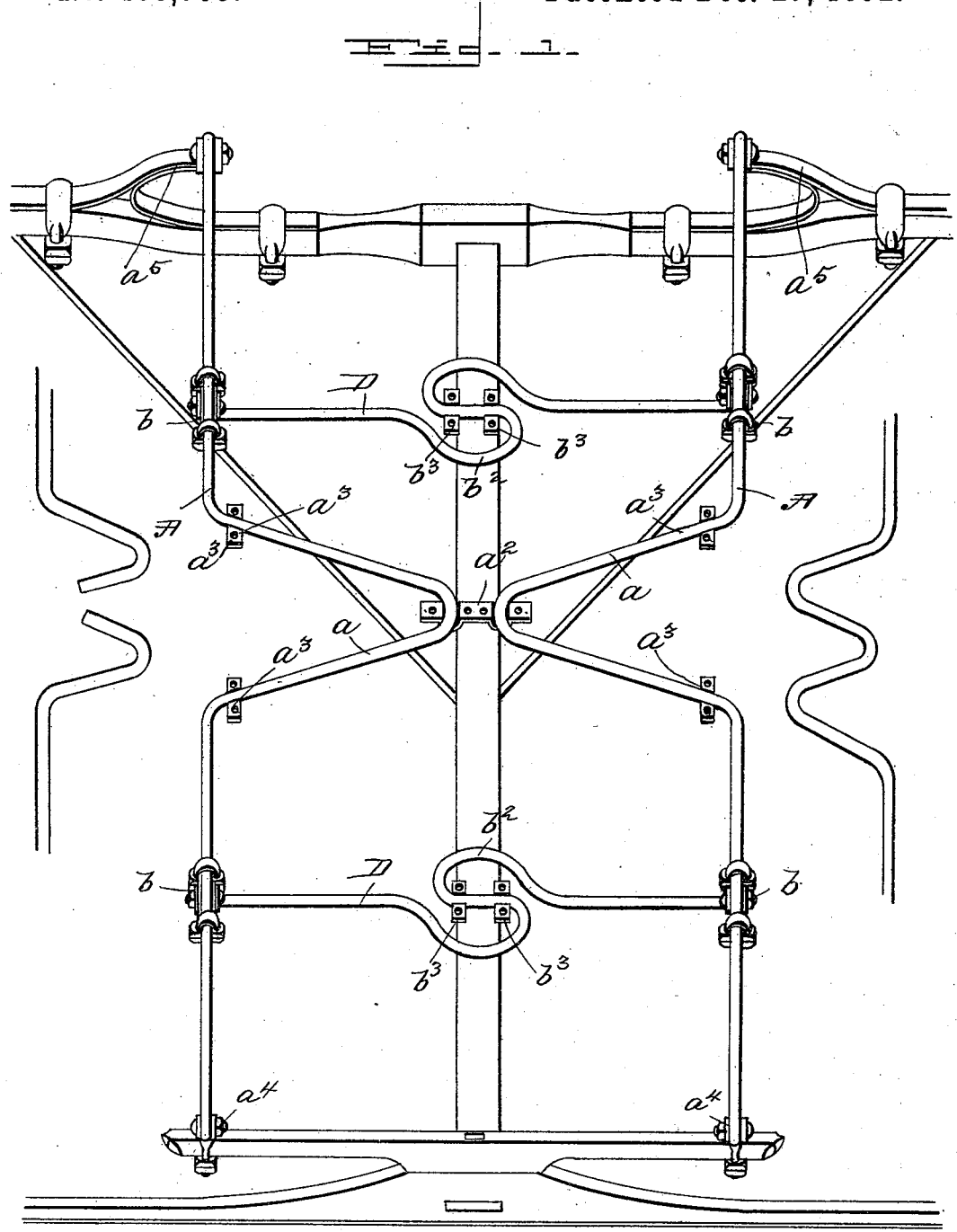

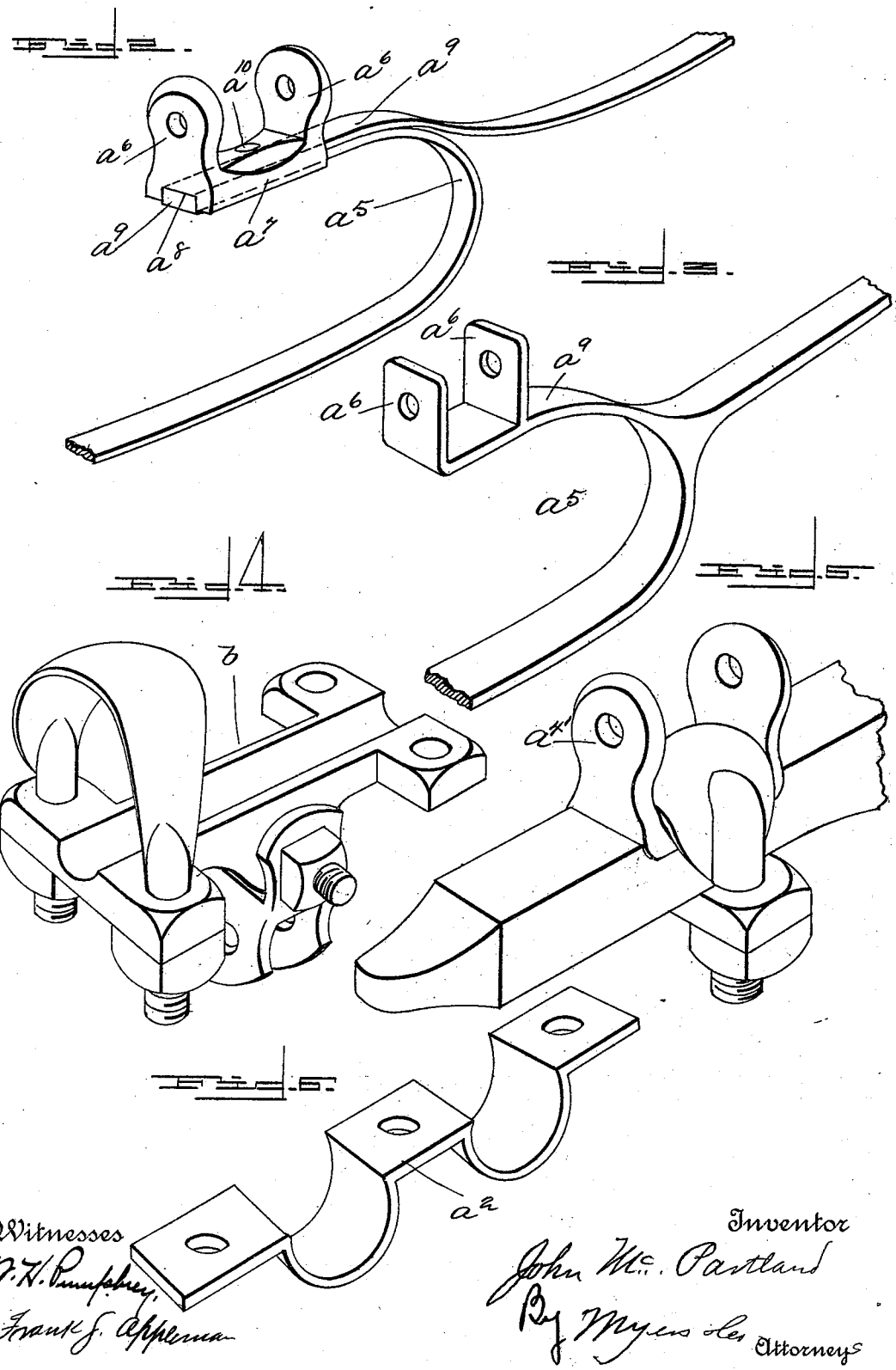

JOHN McPARTLAND, OF WAKEFIELD, RHODE ISLAND.

VEHICLE-SPRING.

SPECIFICATION forming part of Letters Patent No. 488,795, dated December 27, 1892.

Application filed August 25, 1892. Serial No. 444,121. (No model.)

*To all whom it may concern:*

Be it known that I, JOHN MCPARTLAND, a citizen of the United States of America, residing at Wakefield, in the county of Washington and State of Rhode Island, have invented certain new and useful Improvements in Vehicle-Springs, of which the following is a specification, reference being had therein to the accompanying drawings.

This invention relates to improvements in springs for vehicles.

The object of this invention is to provide a spring of such peculiar construction, whereby the strain of the load shall be effectually equalized; furthermore, one that will load level and at the same time be light and of few parts; furthermore, the invention contemplates the provision of a spring that shall be strong, durable and comparatively inexpensive of manufacture.

With these objects in view, the invention consists in a wagon spring proper, having centrally thereof bent up V, or W, portions meeting at the center of the wagon body where they are secured to the underside thereof by suitable supporting brackets, the extreme ends of said spring being pivotally mounted in spring clips secured to the running gear; furthermore, the combination with the side springs as described, of the transverse springs pivotally secured at their ends to said side springs, preventing spreading of the latter and at the same time being adapted to co-operate therewith to facilitate an even motion of the vehicle, and bent up centrally in the form of an S, where they are again secured to the wagon body by suitable shackles.

Furthermore, the invention consists in various novel details of construction, hereinafter to be more fully described and specifically pointed out in the claims.

In describing my invention in detail, reference is had to the accompanying drawings, forming a part of this specification, wherein like letters of reference indicate similar parts in the several views, in which, Figure 1, is a top plan view of the improved spring, shown attached to the running gear of a vehicle. Figs. 2, 3, 4 and 5, are detail views of the supporting clips, brackets &c. Fig. 6, is a view in perspective of a modified form of side spring.

In the drawings A, indicates the side springs having formed centrally thereof inwardly bent V-shaped portions $a$, meeting at the center of the wagon body and secured firmly thereto by the double supporting bracket or shackle $a^2$, and loosely in the single shackle $a^3$. The extreme ends of the side springs being pivotally secured to the running gear by shackles $a^4$ and the spring clips $a^5$, the latter being formed with apertured lugs $a^6$, integral as shown in Fig. 3, or as shown in Fig. 2, wherein the bridge piece $a^7$, connecting said lugs has a recess $a^8$, formed on the under side thereof adapted for the reception of the branch arm $a^9$, of the clip and a screw $a^{10}$, securing the same in position. At intermediate points between the center and ends of the side springs, transverse springs D, are arranged by a pivotal connection at the ends thereof, in clips or shackles $b$, of the said side springs and are formed at the center with bent-up S-shaped portions $b^2$, which are secured against the under side of the body by the supporting brackets $b^3$. These transverse springs serve to brace and retain the side springs in proper position at the same time preventing a spreading of the latter, and co-operating with the same to facilitate an even motion of the vehicle.

It will be readily understood that the spring clips may be cast integral with the rear axle or removably secured thereto as shown; furthermore, that if desired, the side springs may be used separately, that is to say without the transverse spring; furthermore, that various changes may be made in the detail construction and proportion without materially departing from the general idea involved.

Having fully described my invention, what I claim and desire to secure by Letters Patent is:

1. In a spring for vehicles, comprising the side springs having inwardly bent portions suitably secured to the wagon body, the spring clips supporting the rear ends of said springs and the shackles connecting the forward ends thereof to the running gear, substantially as specified.

2. In a spring for vehicles comprising the side springs having inwardly bent portions supported from the underside of the wagon body at a point approximately the center thereof, suitable spring clips on the rear axle supporting the rear ends of said springs, the opposite ends being connected by shackles to the front bolster and the supporting brackets $a^3$, substantially as specified.

3. In a spring for vehicles, comprising the side springs having centrally thereof inwardly bent portions secured to the wagon body, the spring clips $a^5$, supporting the rear ends of said springs as described, the shackles $a^4$, supporting the forward ends thereof, and the supports $a^2$, $a^3$, substantially as described.

4. In a spring for vehicles, the combination with the side springs of the transverse springs having formed centrally thereof S-shaped portions and the supporting brackets or shackles for securing said S-shaped portions at or near the center thereof, substantially as shown and for the purpose set forth.

5. The combination with the side springs having formed centrally thereof inwardly bent portions secured at a point approximately at the center of the wagon body and loosely supported in brackets adjacent to the side thereof, the extreme ends of said springs being pivotally secured to the running gear by the spring clips $a^5$, and the transverse springs having their ends pivotally secured to the side springs and at or near the center thereof to the wagon body, substantially as shown and described.

6. In a vehicle spring, the combination with the side springs having inwardly bent V-portions supported as described, of the transverse springs supported from said side springs and bent up centrally to form an approximate S, substantially as specified.

In testimony whereof I affix my signature in presence of two witnesses.

JOHN McPARTLAND.

Witnesses:
  B. I. ROBINSON, Jr.,
  THOS. A. SHELDON.